Sept. 9, 1958 G. H. FRITZINGER 2,851,328

MOUNTING OF SHEET RECORDS

Filed June 25, 1954

INVENTOR

George H. Fritzinger

United States Patent Office 2,851,328

Patented Sept. 9, 1958

2,851,328

MOUNTING OF SHEET RECORDS

George H. Fritzinger, West Orange, N. J., assignor, by mesne assignments, to McGraw-Edison Company, Elgin, Ill., a corporation of Delaware Application June 25, 1954, Serial No. 439,283

6 Claims. (Cl. 346—138)

Figure 1:
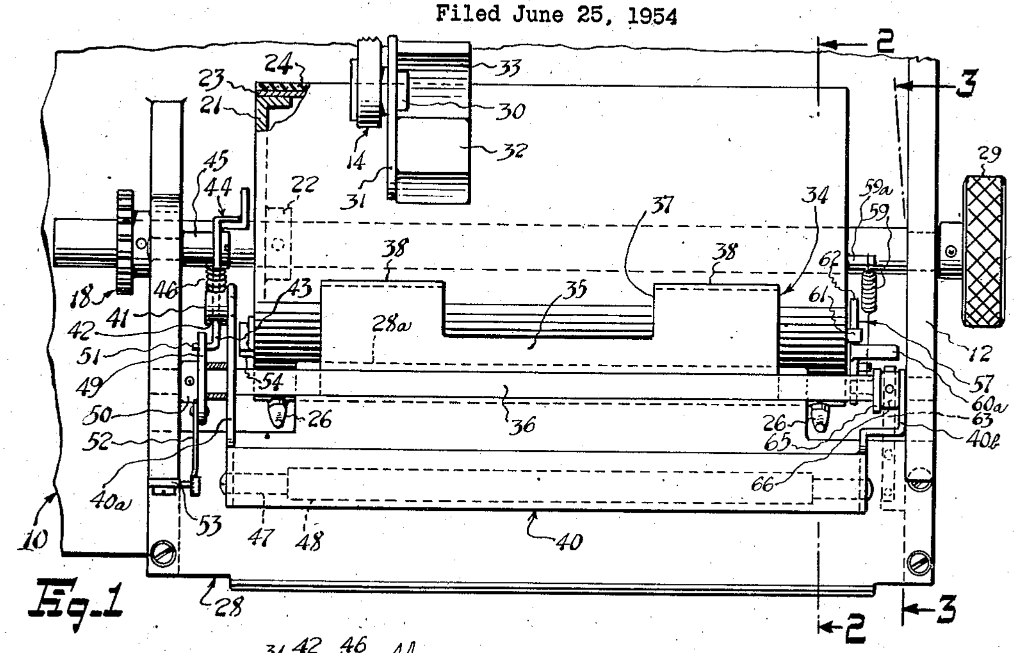

This invention relates to machines in which flexible sheet records are mounted removably on a revolvable record support having an endless record-supporting surface, and is particularly concerned with mechanism adapted to facilitate accurate loading of a sheet record onto the support and to safeguard the sheet record from being torn or damaged in any way during the loading operation.

The present invention is adapted especially for use with magnetic recording and reproducing machines which employ a thin, flexible sheet record coated with magnetizable particles and wrapped through substantially at least one full revolution around the record support with the leading edge thereof attached to the support to provide for drive of the sheet record therewith. In such machines a magnetic head is propelled slowly across the record support as the support is rotated so that the head scans a helical track on the sheet record with repeated crossing of the joint between the leading and trailing edges thereof. When the sheet record is removed from the support and is laid out flat, the scanning track appears as a series of side-by-side parallel lines.

It is necessary that the sheet record be placed accurately on the support so that the individual parallel lines will re-form the continuous helical track when a recorded sheet is mounted on a machine for playback or transcribing. A satisfactory means for attaching the sheet to the support comprises a pair of hooks projecting from the surface of the support to engage a pair of complementary holes in the leading edge of the sheet, as shown for example in the Roberts Patent 2,653,819 dated September 29, 1953; however, my invention is not limited in all aspects to this kind of attaching means. The hooks have the advantage that when a sheet record is placed into a definite loading position, wherein the leading edge overlies the support, the hooks will pick up the sheet automatically as the support is advanced; likewise, upon placing a stripping plate in close proximity to the support and reversely rotating the support, the sheet record is stripped from the support and disengaged automatically from the hooks.

It is important that the sheet record be in a free state at the instant it is picked up by the attaching means so that no undue strain will be exerted to tear the leading edge of the sheet record as the support begins to draw the sheet record into the machine. This becomes particularly important in view of the desirability of using a relatively thin sheet of only a few thousandths of an inch thickness having correspondingly reduced tear resistance. In the usual practice, the sheet record is presented manually to the machine, and if it is presented on an inclined loading plate it must be held in loading position until the very instant that it is picked up by the hooks. Even if the sheet record is presented to the machine across a horizontal loading plate there is a strong tendency of operators to continue to hold the sheet by the hand to prevent its accidental displacement until the wrapping of the sheet on the drum is started. It is however not permissible to allow the operator to keep his hand on the sheet record to the very instant that the sheet record becomes hooked onto the record support because (1) the sheet record, being of thin stock, has limited tear resistance, (2) the operator cannot time his release at the instant the hooks engage the sheet record, and (3) he cannot hold the sheet record so lightly that it can be picked up by the record support without exerting tearing forces at the point where the sheet is attached to the support.

It is an object to provide means for assuring an accurate and safe loading of a thin, flexible sheet record onto a record support without requirement of special care or attention on the part of the operator.

Other objects of the invention are to provide a means for defining a loading position for the sheet record in which the sheet record will become attached to the record support as the record support is advanced and into which the sheet record can be easily manually inserted, to provide a releasable holding means for retaining the sheet record accurately in loading position to permit the hand to be removed from the sheet record before it is attached to the record support, and to provide for automatic release of the holding means from the sheet record at the instant preceding its initial drive by and with the record support.

Still further, objects of the invention are to provide for displacement of the sheet record locating means from the record support prior to providing for drive of the sheet record by the support, and to provide for automatic return of the locating means into operative position as an incident to the final stripping of the sheet record from the support. A feature of the invention in connection with the latter object is to provide for return of the locating means as the record support is reversely rotated but only as an incident to the second passage of the attaching means of the support past the stripping plate.

These and other objects and features of my invention will be apparent from the following description and the appended claims.

Figure 2:
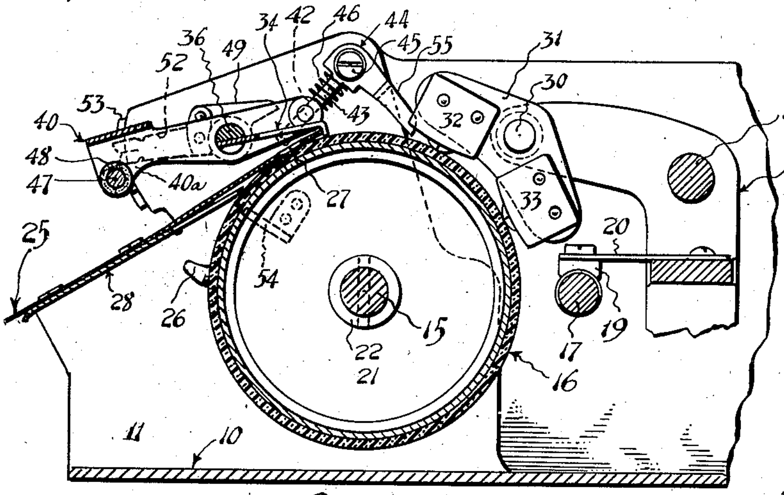
Figure 3:
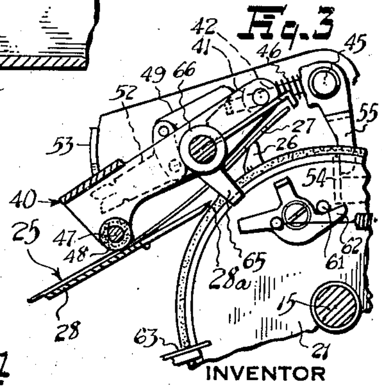
Figure 4:
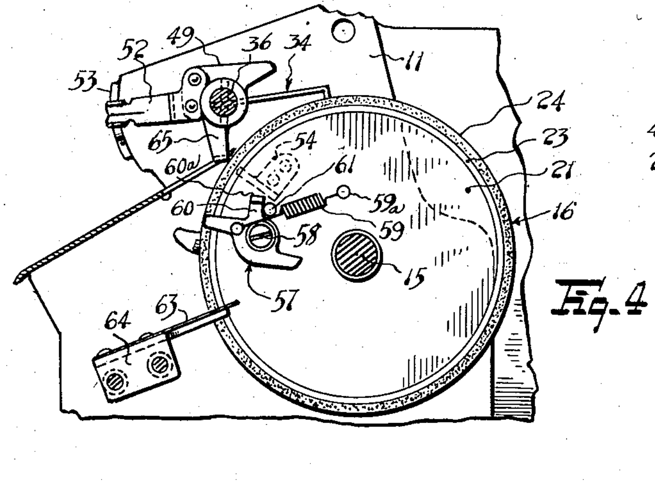

In the description of my invention reference is had to the accompanying drawings, of which Figure 1 is a fractional top plan view of a magnetic sheet-record phonographic machine incorporating the features of my invention;

Figure 2 is a fractional side elevation of this machine with parts in section on the line 2—2 of Figure 1, showing the sheet record locator in locating position and the record holding means or clamp in non-clamping position;

Figure 3 is a fractional side elevation taken substantially on the line 3—3 of Figure 1 showing the clamp and locator in their other positions and showing a trip mechanism at the end of the record support for returning the locator onto the support, the trip mechanism being however shown in inoperative position; and Figure 4 is a fractional view of the mechanism of Figure 3 showing the locator and tripping mechanism in positions which they occupy at the end of an ejection of a sheet record from the record support.

The sheet-record magnetic recording and reproducing machine shown in the accompanying drawings may have a base plate 10 provided with two parallel upright standards 11 and 12. These standards support a cross rod 13 for slidably supporting a carriage 14, and provide bearings for a shaft 15 carrying a rotatable record support in the shape, for example, of a drum 16, as well as bearings for a feed screw 17. The feed screw is in constant drive engagement with the shaft 15 as by means of a gear train fractionally indicated at 18. The carriage has a feed nut 19 mounted resiliently on a cantilever spring 20, which engages the feed screw to propel the carriage slowly along the drum as the latter is rotated.

The drum may comprise flanged disks 21 at its ends having hubs 22 pinned to the shaft 15, and has a tubular member 23 embracing the flanged disks and secured thereto as by welding. Covering the tube 23 is a tube 24 of resilient material such as rubber to provide a yieldable backing for a sheet record 25 when mounted thereon.

The leading edge of the sheet record is attached releasably to the drum for drive of the sheet record in wrap-around relation thereto with preferably a slight overlap. A preferred attaching means comprises two radial hooks 26 axially in line along the drum and positioned respectively near opposite ends thereof. The sheet record has holes 27 (Figure 2) in the leading corner portions thereof for engagement by the hooks. To mount a sheet record on the drum it is first necessary to place it in a loading position. This is done by presenting the sheet into the machine across a loading and stripping plate 28, which is tangential to the drum, until the leading edge of the sheet record overlies the drum and the holes 27 are substantially centered with respect to a radius line of the drum at right angles to the sheet (Figure 2). Thereupon, the drum is advanced as by a knob 29 on the shaft 15 to cause the hooks to engage the holes 27 and thereupon propel the sheet record around the drum, it being understood that as the drum is so advanced while the sheet record is in loading position the hooks will first deflect upwardly the leading end portion of the record and then enter the holes by the downward deflection of the sheet caused by its weight and resilient tendency to resist upward deflection.

Pivoted at 30 to the carriage 14 is a rocker beam 31 carrying an erase head 32 at one end and a record-reproduce head 33 at the other. The two heads contact the sheet record in a plane at right angles to the shaft 15 so as to ride in the same track on the record. In response to their weight and/or any torsional biasing of the carriage 14, if desired, the heads engage the sheet record with sufficient pressure to have firm contact therewith. As the drum is advanced and the carriage is progressively moved by the feed screw 17, the heads scan a helical track on the sheet record which, when the sheet record is removed and laid out flat, appears as a series of parallel lines, as aforementioned.

The particular form of sheet-record machine herein so far described is intended only as an illustrative one with which the loading mechanism of my invention is satisfactorily operable. This loading mechanism—which is adapted to facilitate the proper loading and removal of sheet records onto and from the machine and to safeguard the sheet records from being accidentally torn or damaged during the loading operation—comprises a sheet-record stop or locator 34 in the form, for example, of a wide plate 35 spanning the major length of the drum and secured as by welding to a cross rod 36 pivoted at its ends in the standards 11 and 12. The plate 35 has a central cutaway 37 to provide it with two spaced locating arms 38 which engage the periphery of the drum to provide abutments spaced longitudinally of the drum against which a sheet record is stopped and located in loading position as the sheet record is slid up the loading plate into the machine.

At the front of the machine overlying the loading plate 28 there is a record-clamping device comprising a wide bail 40 having left and right arms 40*a* and 40*b* pivoted to end portions of the cross rod 36. The left arm 40*a* of the bail projects rearwardly from the rod 36 and has a short pin 41 pivoted to the left side thereof. This pin has a diametrical hole 42 extending therethrough which is slidably engaged by a rocker arm 43 of a bell crank lever 44 pivoted to a stud 45 on the standard 11. Interposed between the pin 41 and hub of the rocker arm is a compression spring 46 forming with the rocker arm an over-center device for biasing the record clamp into its clamping and non-clamping positions, as will appear.

Bridging the forward end portions of the arms of the bail is a rod 47 covered throughout its major length by a rubber tube 48 to form a yieldable surface for clamping the record sheet against the loading plate in loading position. When the record clamp is in its raised position shown in Figure 2 it clears the loading plate by a wide margin. After the sheet record is inserted against the locator 34, the operator presses the record clamp downwardly to cause it to snap over center and engage the sheet record to hold it firmly in loading position. This clamping of the sheet record permits the operator to remove his hand therefrom with a feeling of confidence that it will not be accidentally displaced from loading position until it is picked up by the hooks 26 of the drum. As a final incident to moving the record clamp into clamping position, the locator 34 is raised into non-locating position to clear the way for the wrap-around of the sheet record on the drum. For this purpose there is provided a cam finger 49 having a hub 50 secured to the left end of the cross rod 36. In the final portion of the downward movement of the record clamp a side lug 51 on the rocker arm 43 impinges against the cam 49 and turns the rod 36 counterclockwise, as shown in Figure 2, to raise the locator from the drum. The locator is biased over center in locating and non-locating positions as by a cantilever spring 52 secured to the cam and slidably engaging with pressure the edge of a plate 53 on the standard 11, which edge has the shape of a wide V. After pressing the clamp into clamping position, the clamp and locator occupy the positions shown in Figure 3.

Having clamped the sheet record in loading position as described, the operator will next advance the drum by the knob 29. At the instant just prior to when the hooks engage the holes 27, a cam member 54 bracketed to the left end of the drum impinges against an arm 55 of the bell crank lever 44, as shown in Figure 3, to turn the record clamp clockwise, wherefore to release its clamping pressure from the sheet record. The cam 54 has an extended surface for turning the arm 55 through a sufficient angle to move the record clamp over center and, having done so, the record clamp moves onwardly to a fully raised position by the over-center mechanism, the record clamp and over-center mechanism being now in the positions shown in Figure 2; however, the locator still remains in raised position shown in Figure 3. With continued advance of the drum the sheet record becomes fully wrapped thereabout for normal recording and playback use of the machine.

When the drum is reversely rotated by the knob 29 the sheet record is propelled backwardly by the hooks 26, and when the trailing edge thereof—which tends normally to bow outwardly from the drum—comes to the rear edge 28*a* of the plate 28—herein termed the "stripping edge"—the sheet record moves over the plate and is stripped thereby from the drum. Since the sheet record has an overlap, the hooks 26 must pass the stripping edge 28*a* twice before the sheet record is totally ejected, it being only as the hooks pass the stripping edge the second time that they become disengaged from the holes 27 of the sheet machine.

The record clamp remains in raised, non-clamping position as the sheet record is ejected but the locator 34 is returned onto the drum by a trip pawl 57 just as the hooks pass the stripping edge the second time and become disengaged from the sheet record. The trip pawl 57 is pivoted at 58 to the right end of the drum and is biased over center by a tension spring 59 connected between the pawl and a pin 59*a* on the drum. The pawl has an operative position (Figure 4) defined by abutment of an arm 60 thereof against a pin 61 on the drum but it normally occupies an inoperative position (Figure 3) defined by abutment of an arm 62 against the reverse side of the same pin. Only when the drum is reversely rotated to eject a sheet record therefrom is the pawl shifted over center into an operative position. This over-center shift is made after the hooks 26 have passed the stripper edge 28*a* the first time by the impingement of a lug 60*a* of the arm 60 against an abutment 63 constituting a cantilever spring bracketed at 64 to the standard 12 and backed by the bracket throughout its length except for its end portion which strikes the lug, the backing being provided so that the spring is rigid in directions of reverse rotation of the drum. Because of the onward movement of the pawl 57 when shifted over center, the lug 60*a* is moved radially inwardly to clear the abutment spring 63 when moved next thereby. As the hooks 26 are moved past the stripping edge 28*a* the second time in the ejection of the sheet record, the pawl 57 strikes an arm 65 secured to the right end of the rod 36 by means of a hub 66 thereof being pinned to the rod (Figure 1), and returns the locator onto the drum to restore the loading apparatus to condition for the mounting of a new sheet record. Note that although the pawl 57 remains in operative position after the return of the locator and projects radially beyond the abutment spring 63 when in operative position, it does not interfere with this spring because it is offset sidewise therefrom as shown in Figure 1. Thus, when the pawl 57 is in operative position and the locator is in locating position, both as shown in Figure 4, the pawl is totally free from engagement with all parts during both forward and reverse directions of movement of the drum.

In subsequent mounting of a new sheet record onto the drum the record clamp is tripped to clamp the new sheet in loading position and to raise the locator 34 as before described. This returns the control arm 65 on shaft 36 to its innermost position shown in Figure 3. Since the trip pawl 57 was left in operative position at the end of the prior record ejection, it will strike the arm 65 in the first traversal of the hooks 26 past the stripping edge and as a result the trip pawl is turned over center in a counterclockwise direction to inoperative position. This restoration of the trip pawl occurs just prior to the cam 54 striking the arm 55 to lift the record clamp from the sheet record, as shown by the relative positioning of the parts in Figure 3. However, upon the pawl 57 being tripped over center into inoperative position shown in Figure 3, the lug 60*a* is restored into position to strike the abutment spring 63 once during each revolution of advance of the drum. Since the pawl is constrained against movement by the stop pin 61 as it impinges against the abutment spring 63, this abutment spring is mounted so as to have freedom of movement in the direction of advance of the drum to permit it to snap over the lug and allow the lug to pass thereby.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. In a machine having an advanceable record support with an endless record-supporting surface about which a flexible sheet record is adapted to be wrapped: the combination of means for attaching the leading edge of a sheet record to said support to provide for drive of the sheet record with the support; means movable into effective position to locate a sheet record for attachment to said support; means movable for holding the sheet record in its position for said attachment; means operable upon attachment and wrap-around of a sheet record onto said support for releasing said holding means from the sheet record and for moving said locating means out of locating position; and means operable by said support during reverse movement thereof for returning said locating means into locating position.

2. In a machine having an advanceable and reversible record support with an endless record-supporting surface about which a flexible sheet record is adapted to be wrapped with its leading edge attached to the support, and including a stripper element for stripping the sheet from the support as the suport is reversely rotated: the combination of projecting hooks on said support and complementary holes in the leading edge of the sheet record for engagement by said hooks to drive the sheet record with the support; a locator movable to engage said support and define an abutment for the sheet record to locate it in position for engagement by said hooks as the record support is advanced; holding means movable to engage a located sheet record and hold it in located position until the sheet record is engaged by said hooks; means for moving said holding means into effective position and lifting said locator from the support in one operation; means responsive to advance of said support and operable prior to engagement of the sheet record with said hooks for releasing said holding means from the sheet record; a stripper member for causing a mounted sheet record to be stripped from said support as the support is reversely rotated; and means operable by reverse movement of said support at the completion of stripping of the sheet record therefrom for restoring said locator to locating position.

3. In a machine having an advanceable and reversible record support with an endless record-supporting surface about which a flexible sheet record is adapted to be wrapped with its leading edge attached to the support, and including a stripper element for stripping the sheet from the support as the support is reversely rotated: the combination of means for releasably attaching the leading edge of a sheet record to said support and a locator movable to engage said support and provide an abutment for the sheet record to locate it in position for attachment to said support; means for moving said locator out of contact with said support; means for reversing said support to strip the sheet record therefrom; and means timed with the reverse rotation of said support for returning said locator into engagement with the support.

4. In a machine having an advanceable and reversible record support with an endless record-supporting surface about which a flexible sheet record is adapted to be wrapped with its leading edge attached to the support, and including a stripper element for stripping the sheet from the support as the support is reversely rotated: the combination of means on said support for releasably attaching the leading edge of a sheet record thereto to provide for drive of the sheet record therewith; a locator movable to engage said support and provide an abutment for a sheet record to locate it in position for attachment to said support; means for moving said locator out of engagement with said support; and means responsive to reverse rotation of said support only on movement of said attaching means past said stripping plate for the second time for returning said locator into engagement with said support.

5. The combination set forth in claim 4 wherein said last-stated means comprises a movable trip element carried by said support and normally positioned out of operative relation to said locator, said trip element being shiftable into position for operative engagement with said locator to return the locator as the support is reversely rotated; and means responsive to reverse rotation of said support within the first fractional revolution thereof from any starting position for shifting said trip element to render it effective to return said locator on completion of the next complete revolution of reverse rotation of said support.

6. In a machine having an advanceable record support with an endless record-supporting surface about which a flexible sheet record is adapted to be wrapped; the combination of means for attaching the leading edge of a sheet record to said support to provide for drive of the sheet record with the support; guide means for directing a sheet record in relation to said support; a movably-mounted guide and stop member for locating the leading edge of the sheet record in contiguous relation to said supporting surface as the sheet record is moved along the said guide means, said locating member having an effective position in contact with said record-supporting surface; movably-mounted means for holding the sheet record on said guide means; actuatable means coupled to said locating and holding means for moving said holding means into holding position and said locating means out of locating position in one operation; means mounting said holding and locating means for independent shifting movement between effective and ineffective positions; means to cause said locating means to be moved out of the path of mounting of a sheet record onto said support as said holding means is moved into holding position; means operable for advancing said record support to wrap a sheet record thereabout; and means controlled by said advancing means to cause said holding means to be released from the sheet record prior to drive of the sheet record by said support.

References Cited in the file of this patent

UNITED STATES PATENTS

| | | |
|---|---|---|
| 2,482,408 | Ford | Sept. 20, 1949 |
| 2,668,718 | Roberts | Feb. 9, 1954 |
| 2,695,785 | Dashiell et al. | Nov. 30, 1954 |